Aug. 11, 1936.　　　　T. B. BUELL　　　　2,050,828

CHUCK

Filed Dec. 2, 1935　　　　2 Sheets-Sheet 1

Inventor:
Timothy B. Buell,

Aug. 11, 1936.  T. B. BUELL  2,050,828
CHUCK
Filed Dec. 2, 1935   2 Sheets-Sheet 2

Inventor:
Timothy B. Buell,

Patented Aug. 11, 1936

2,050,828

UNITED STATES PATENT OFFICE 2,050,828

CHUCK

Timothy B. Buell, Rockford, Ill., assignor to Sundstrand Machine Tool Co., Rockford, Ill., a corporation of Illinois Application December 2, 1935, Serial No. 52,476

16 Claims. (Cl. 279—106)

The invention relates generally to a workholder or chuck for securing a workblank in a machine tool and relates more particularly to a chuck for securing a piston to be machined.

An object of the invention is to provide a chuck of novel and improved construction which rigidly secures and centers a piston in a manner leaving the entire outer surface of the piston free and exposed so as to permit machining of the entire piston without removal from the chuck.

More particularly it is an object to provide a chuck for a piston having means engaging the piston internally to secure the piston on the chuck and to rotate the same therewith and a yieldable center engaging an internal boss on the head or closed end of the piston for centering the same.

Other objects and advantages will become apparent from the following detailed description taken in connection with the accompanying drawings, in which.

Figure 1:
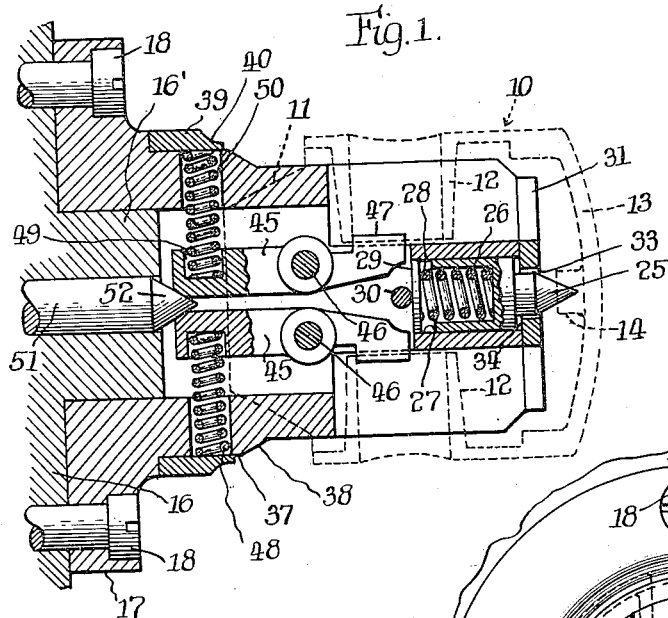
Fig. 1 is a diametrical sectional view of a chuck embodying the features of the invention, a piston mounted thereon being shown in dotted outline.

While the invention is susceptible of various modifications and alternative constructions and is adapted for securing various types of workblanks, it is here shown and will be described hereinafter in a preferred embodiment and one modification particularly adapted for securing a piston, but it is not intended that the invention is to be limited thereby to the specific constructions shown but it is intended to cover all modifications and alternative constructions falling within the spirit and scope of the invention as defined by the appended claims.

For purposes of disclosure, the chuck is shown in the drawings and will be described hereinafter as adapted for securing a piston 10, shown in dotted outline in each of the figures. The piston comprises a split skirt 11, the usual radially inwardly projecting wrist pin bearings 12, and at its head or closed end 13 an internal boss 14 recessed for the reception of a center.

Figure 2:
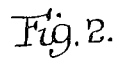
Fig. 2 is an end elevational view of the chuck shown in Fig. 1, the piston again being shown in dotted outline.
Figure 3:
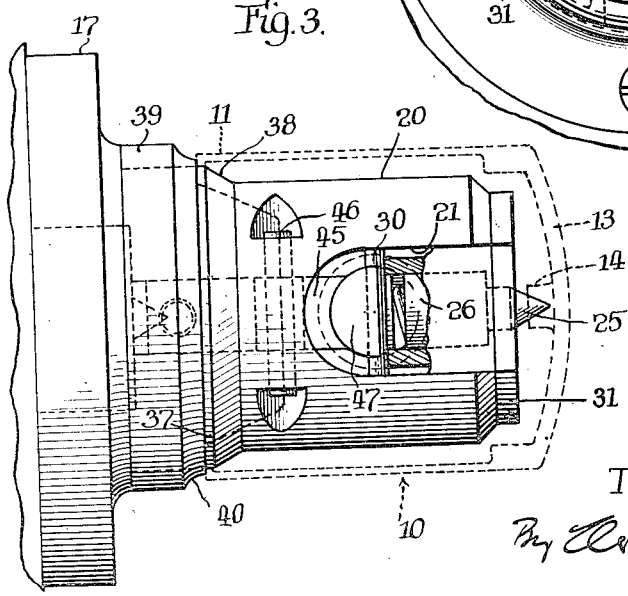
Fig. 3 is a top plan view of the chuck in Fig. 1, the piston again being shown in dotted outline.

The chuck is adapted to be secured to the end of a spindle 16 and in turn to secure and center a piston while leaving the entire outer surface of the piston free and exposed so as to permit complete machining of the piston without removal from the chuck. In the preferred embodiment shown in Figs. 1 to 3, the chuck is cylindrical and over a major portion of its length is hollow. At its base, the chuck is formed with an annular flange 17 through which bolts 18 project to secure the chuck to the spindle 16. For greater rigidity in the mounting of the chuck, the spindle is formed with a projection 16' extending a short distance axially into the base of the chuck.

At its forward or head end, the chuck terminates in a cylindrical body portion 20 slightly smaller in diameter than the internal diameter of a piston and is adapted to be received within a piston to be mounted on the chuck. A piston is positioned on the chuck by movement axially or longitudinally thereof and to that end the body portion 20 is formed with longitudinal, diametrically oppositely disposed grooves 21 open at their forward end and wide enough to accommodate the wrist pin bearings 12. A piston is thus easily positioned on the chuck by a simple axial movement and when so positioned is held against rotation relative to the chuck by engagement of the wrist pin bearings with the grooves.

The head end of a piston mounted on the chuck is centered without the necessity of the usual tailstock center, which prevents complete machining of the piston while in the usual chuck, by the provision of an internal center 25 projecting from the body portion 20 and into engagement with the internal boss 14. The center 25 preferably is yieldably and rotatably mounted and herein is formed on the end of a hollow cylindrical plunger 26 slidable and rotatable in a bore 27 in the body portion. Within the plunger 26 is a compression spring 28 which at one end abuts a washer 29 held in the bore 27 by a transverse pin 30 and at the other end abuts the plunger to urge the center 25 outwardly into engagement with the boss 14. The plunger 26 is retained in the bore 27 by a plate 31 removably secured over the end of the body portion by screws 32. The plate 31 has an aperture 33 through which the center 25 projects but which aperture is smaller than the bore 27 so that the plate forms an annular shoulder 34 abutted by the sleeve 26 which is of larger diameter than the center 25.

To center the skirt end of a piston, the chuck has near its base means forming a templet or locator comprising an annular portion 37 just equal in diameter to the internal diameter of a piston at the skirt end. Merging the annular portion 37 with the body portion 20 is a frusto-conical cam surface 38 which facilitates sliding the skirt onto the annular portion 37. Movement of a piston onto the chuck is limited by abutment of the skirt with an annular ring 39. The ring 39 preferably has an annular groove 40 so that a piston on the chuck extends radially beyond the ring at the edge of the skirt and thus enables the piston to be machined to the very edge of the skirt without damage to the ring.

Means positioned within the chuck and also engaging only the interior of a piston is provided for securing a piston on the chuck in centered position. Herein the means is in the form of a pair of levers 45 extending longitudinally of the chuck and pivoted intermediate their ends on parallel, transverse shafts 46. At its forward end, each lever has a semi-cylindrical, radial extension 47 for projection into one of the wrist pin bearings 12. The levers and the extensions are proportioned so that the extensions have a snug fit with the bearings 12 when the piston's skirt abuts the ring 39. The piston is thus securely held against longitudinal movement as well as against rotation relative to the chuck. Each lever is urged into engagement with a bearing 12 by a compression spring 48 bearing at one end in a socket 49 formed in the end of the lever and at the other end extending through an aperture 50 in the chuck and abutting the ring 39. Having the springs extend through the apertures 50 into engagement with the ring 39 greatly facilitates assembly. The levers are pivoted to release the piston by a rod 51 slidable axially of the spindle and terminating in a tapered end 52 disposed between the ends of the levers and operable upon axial movement to cam the ends of the levers apart and thus withdraw the extensions 47 from the wrist pin bearings 12.

Figure 4:
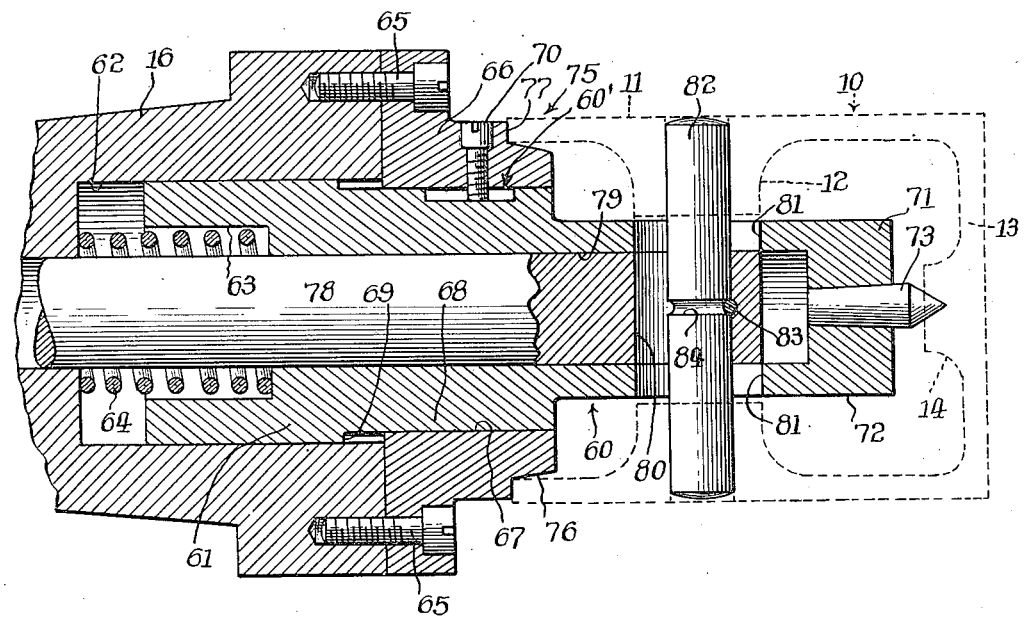
Fig. 4 is a diametrical sectional view of a modified form of chuck embodying the features of the invention, a piston mounted thereon being shown in dotted outline.
Figure 5:
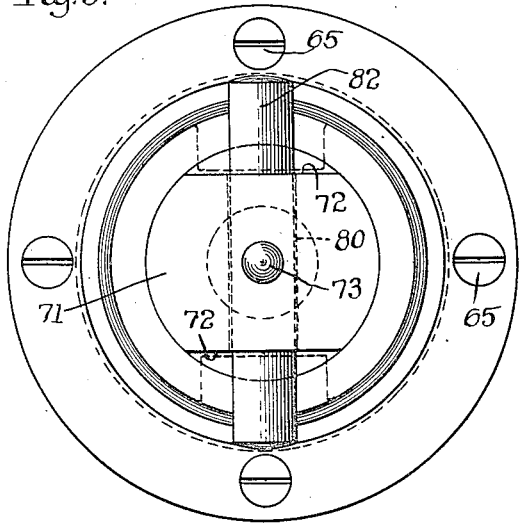
Fig. 5 is an end elevational view of the chuck shown in Fig. 4, the piston again being shown in dotted outline.

In the modified form of the invention shown in Figs. 4 and 5, the chuck comprises an elongated member generally designated 60 having an inner cylindrical end portion 61 slidable in a longitudinal bore 62 in the spindle 16 or some other base member. The end portion 61 has a counter-bore 63 in which is received one end of a compression spring 64 the other end of which abuts the spindle to urge the member 60 outwardly. Secured to the end of the spindle 16 by bolts 65 is an annular plate 66 having an axial bore 67 slightly smaller in diameter than the bore 62. The member 60 has an intermediate portion 68 slightly reduced in diameter to form a shoulder 69 adapted to abut the annular plate 66 and thus limit outward movement of the member 60. A driving connection between the spindle and the member 60 is formed by a screw 70 extending radially through the plate 66 into a keyway 60' formed in the member 60.

At its projecting end, the member 60 terminates in a body portion 71 adapted to be received within a piston to be machined and to that end is formed with oppositely disposed parallel flat faces 72. A piston to be machined is mounted on the chuck by longitudinal movement and is disposed with its wrist pin bearings 12 opposite the flat faces 72 (see Fig. 4).

In order that the entire piston remain exposed for machining, the head of the piston is internally centered. To that end, there is secured in the end of the body portion 71 a center 73 adapted to engage the boss 14 formed on the inside of the piston head 13. Because of the large bearing surface between the member 60 and the spindle 16 the center 73 forms a rigid and accurate center for the head of the piston. The skirt end of the piston is centered by means of a locator 75, formed on the end of the plate 66, which comprises a frusto-conical cam surface 76 which enters the piston for centering the skirt end and an annular shoulder 77 against which the skirt abuts to limit the movement of the piston onto the chuck.

Means is also provided for engaging the piston internally to secure the same against longitudinal and rotational movement relative to the chuck. Here in this means comprises a rod 78 slidable in an axial bore 79 in the member 60. At the end in the body portion 71, the rod 78 has a diametrical slot 80 registering with slots 81 in the flat faces 72. The slots 80 and 81 are just wide enough to receive a wrist pin 82 which is inserted through the bearings 12, the body portion 71 and the rod 78 after the piston is placed on the chuck. To permit limited relative longitudinal movement the slot 80 is greater in longitudinal length than the diameter of the wrist pin 82 and slots 81 are longer than slot 80. Drawing rod 78 inwardly, then draws lug 14 into engagement with center 73 and forces the skirt end of the piston onto the locator 75, the member 60 yielding to permit such movement.

The piston is then securely held against longitudinal and rotational movement relative to the chuck. To aid in initially positioning the wrist pin 82 and in retaining the same, the rod 78 carries a pin 83 for engagement with an annular groove 84 on the wrist pin.

It is believed apparent from the foregoing that I have perfected a rugged chuck for securing a piston in centered position while leaving the entire outer surface of the piston free and exposed to enable the entire piston to be machined without removal from the chuck. The piston is centered at both the head end and the skirt, and is rigidly held on the centering means and against rotation relative to the chuck. In addition a piston is readily mounted on the chuck by a simple axial movement.

I claim as my invention:

1. A chuck for securing a workblank such as a piston in a manner to permit machining of the entire piston without removal from the chuck comprising a cylindrical body portion having diametrically oppositely disposed longitudinal grooves open at the forward end of the body portion, said grooves being slightly greater in width than the outside diameter of the wrist pin bearings of a piston so as to permit placing of a piston on the chuck by axial movement of the piston with its wrist pin bearings disposed in the grooves of the body portion, whereby said grooves are adapted to restrain the piston against rotation relative to the chuck, locator means near the base of the chuck adapted to be engaged by the skirt of the piston for centering the same, a yieldable center projecting from the forward end of the body portion for engagement with an internal boss on the head of the piston for centering the head, and pivotally mounted levers extending longitudinally within the chuck each formed at its forward end with a radial extension adapted to project into and engage a wrist pin bearing to secure the piston on the chuck against longitudinal and relative rotational movement.

2. A chuck for securing a workblank, such as a piston, in a manner to permit machining of the entire piston without removal from the chuck comprising a cylindrical body portion having diametrically oppositely disposed longitudinal grooves open at the forward end of the body portion to permit placing of a piston on the chuck by axial movement of the piston with its wrist pin bearings disposed in the grooves of the body portion, locator means near the base of the chuck adapted to be engaged by the skirt of the piston for centering the same, a center projecting from the forward end of the body portion for engagement with an internal boss on the head of the piston for centering the head, and means within the body portion operable to engage the wrist pin bearings of the piston to secure the same against longitudinal movement off of the chuck and to hold the piston against rotation relative to the chuck.

3. A chuck for securing a workblank, such as a piston in a manner to permit machining of the entire piston without removal from the chuck comprising a cylindrical body portion having diametrically oppositely disposed longitudinal grooves open at the forward end of the body portion, said grooves being slightly greater in width than the outside diameter of the wrist pin bearings of a piston so as to permit placing of a piston on the chuck by axial movement of the piston with its wrist pin bearings disposed in the grooves of the body portion, whereby said grooves are adapted to restrain the piston against rotation relative to the chuck, locator means near the base of the chuck adapted to be engaged by the skirt of the piston for centering the same, a center projecting from the forward end of the body portion for engagement with an internal boss on the head of the piston for centering the head, and means within the body portion operable to engage the piston on the interior to secure the same against longitudinal movement off of the body portion and against rotation relative thereto.

4. A chuck for securing a workblank such as a piston in a manner to permit machining of the entire piston without removal from the chuck comprising a body portion upon which a piston is placed by relative axial movement of the piston and the body portion, locator means near the base of the chuck adapted to be engaged by the skirt of the piston to center the same, a center projecting from the forward end of the body for engagement with coacting centering means on the inside of the head of the piston for centering the head, and means engaging the piston on the interior holding the same on said locator means and said center against axial and rotational movement relative to the chuck.

5. In a chuck for securing a workblank such as a piston in a manner to permit machining of the entire piston without removal from the chuck, means engaging a piston on the interior for securing the same against longitudinal and rotational movement relative to the chuck, and a yieldable and rotatable center projecting from the forward end of the chuck for engagement with an internal boss formed on the head of the piston for centering the head of the piston.

6. In a chuck for securing a piston in a manner to permit machining of the entire piston without removal from the chuck, means operable to engage the interior of a piston placed on the chuck to secure the piston on the chuck against longitudinal and rotational movement relative to the chuck, locator means received within the skirt end of the piston for centering the end, and means for centering the head end of the piston projecting from the forward end of the chuck for engagement with coacting centering means on the inside of the head of the piston.

7. In a chuck for securing a piston in a manner leaving the entire outer surface of the piston free to be machined without removal of the piston from the chuck, a body portion received axially within a piston to be machined, means operable to engage the piston on the interior for securing the same against longitudinal and rotational movement relative to the chuck, and means for centering and supporting the head end of the piston projecting from the forward end of the portion received within the piston for engagement with a recess formed on the inner face of the head of the piston.

8. A chuck for securing a workblank such as a piston in a manner to permit machining of the entire piston without removal from the chuck comprising a cylindrical body portion having diametrically oppositely disposed longitudinal grooves open at the forward end of the body portion, said grooves being slightly greater in width than the outside diameter of the wrist pin bearings of a piston so as to permit placing of a piston on the chuck by axial movement of the piston with its wrist pin bearings disposed in the grooves of the body portion, locator means near the base of the chuck adapted to be engaged by the skirt of the piston for centering the same and limiting the movement of the piston onto the chuck, a yieldable center projecting from the forward end of the body portion for engagement with an internal boss on the head of the piston for centering the head, and a pair of levers extending longitudinally within the chuck and pivotally mounted intermediate their ends on parallel shafts, each of said levers being formed at its forward end with a radial extension adapted to project into and engage a wrist pin bearing to secure the piston on the chuck against longitudinal and relative rotational movement.

9. A chuck for securing a work blank such as a piston in a manner to permit machining of the entire piston without removal from the chuck comprising a cylindrical body portion having diametrically oppositely disposed longitudinal grooves open at the forward end of the body portion, said grooves being slightly greater in width than the outside diameter of the wrist pin bearings of a piston so as to permit placing of a piston on the chuck by axial movement of the piston with its wrist pin bearings disposed in the grooves of the body portion, locator means near the base of the chuck adapted to be engaged by the skirt of the piston for centering the same, a center projecting from the forward end of the body portion for engagement with an internal boss on the head of the piston for centering the head, means within the body portion operable to engage the interior of the piston to secure the same against longitudinal and rotational movement relative to the chuck normally urged into engaging relation with the piston, and means operable to disengage said first named means from the piston.

10. A chuck for securing a piston in a manner to permit machining of the entire piston without removal from the chuck comprising a flanged base for securing the chuck to a spindle, a cylindrical body portion having diametrically oppositely disposed longitudinal grooves open at the forward end of the body portion to permit placing of a piston on the chuck by relative axial movement with the wrist pin bearings of the piston in the grooves of the body portion, locator means near the base of the chuck engaged by the skirt of the piston when in position on the chuck for centering the skirt end of the piston, a yieldable center projecting from the forward end of the body portion for engagement with an internal boss on the head of the piston for centering the head, a pair of pivotally mounted levers each having a radial extension at its forward end for projection into one of the wrist pin bearings to secure the piston against longitudinal movement, a spring urging each of the levers into engagement with a wrist pin bearing, and means for pivoting said levers to release the piston.

11. A chuck for securing a piston in a manner leaving the entire outer surface of the piston free to be machined without removal from the chuck comprising a cylindrical body portion having diametrically oppositely disposed longitudinal grooves open at the forward end of the body portion, said grooves being slightly greater in width than the outside diameter of the wrist pin bearings of a piston so as to permit placing of the piston on the chuck by axial movement of the piston with the wrist pin bearings in the grooves of the body portion, a center projecting from the end of the body portion for engagement with coacting centering means on the inside of the head of the piston for centering the piston, an annular portion received within the skirt end of the piston for centering that end of the piston, an annular cam surface merging said body portion and said annular portion to facilitate reception of the annular portion within the skirt end of the piston, a pair of levers extending longitudinally of the body portion pivotally mounted intermediate their ends on parallel shafts, each of said levers at its forward end having a semi-cylindrical extension for projection into one of the wrist pin bearings, a radially disposed compression spring engaging the rear end of each lever to urge the lever into engagement with the bearing, and a ring holding said springs in engagement with said levers and providing an abutment limiting movement of the piston onto the chuck.

12. A chuck for securing a workblank such as a piston in a manner to permit machining of the entire piston without removal from the chuck comprising a longitudinally yieldable member having a body portion for projection into a piston to be machined, a center projecting from the end of the body portion for engagement with coacting centering means on the inside of the head of the piston for centering the head, locator means engaging the skirt of the piston for centering the skirt end, and means engaging the piston internally for drawing the piston onto the chuck and thereby holding the same against longitudinal and rotational movement relative to the chuck.

13. A chuck for securing a workblank such as a piston in a manner to permit machining of the entire piston without removal from the chuck comprising a center for engagement with coacting centering means on the inside of the head end of a piston for centering the head, locator means engaging the skirt of the piston for centering the skirt end, and a rod movable axially of the chuck adapted to engage a wrist pin inserted through the bearings of the piston to draw the piston onto the chuck.

14. A chuck for securing a workblank such as a piston in a manner to permit machining of the entire piston without removal from the chuck comprising a longitudinally yieldable member having a body portion for projection into a piston to be machined, a center projecting from the end of the body portion for engagement with coacting centering means on the inside of the head of the piston for centering the head, locator means engaging the skirt of the piston for centering the skirt end, a wrist pin inserted through the bearings of the piston, and a rod movable axially of the chuck and engaging said wrist pin to draw the piston onto the locator means and the center for the head of the piston.

15. A chuck for securing a workblank such as a piston in a manner to permit machining of the entire piston without removal from the chuck comprising a body portion adapted to be received axially within a piston to be secured on the chuck, a center secured in the end of said body portion for engagement with coacting centering means on the inside of the head end of the piston for centering the head, locator means engaging the skirt of the piston for centering the skirt end, a rod slidable axially of said body portion, and apertures in said rod and body portion registering with the wrist pin bearings of the piston for the insertion therethrough of a wrist pin through which the rod securely holds the piston on the center and the locator means.

16. A chuck for securing a workblank such as a piston in a manner to permit machining of the entire piston without removal from the chuck comprising a base having an axial bore, an elongated member having an inner end slidable in the bore, a compression spring interposed between the base and the member in the bore urging the member outwardly, an annular plate secured to said base limiting the outward movement of said member, a body portion formed by the outer end of said member having diametrically oppositely disposed parallel flat faces, said portion being adapted to be received within a piston mounted thereon by axial movement with its wrist pin bearings opposite the flat faces, a center secured in the end of said body portion for engagement with coacting centering means on the inside of the head of the piston for centering the head, locator means on said plate receivable within the skirt end of the piston for centering the same, a reciprocable rod extending axially of said base and said member, and a diametrical slot in said rod and slots in the flat faces of said member registering with the slot in said rod for the projection therethrough of a wrist pin of the piston through which the rod engages the piston to secure the same on the chuck.

TIMOTHY B. BUELL.